United States Patent
Cho

(10) Patent No.: US 7,123,474 B2
(45) Date of Patent: Oct. 17, 2006

(54) DAMPING APPARATUS

(75) Inventor: Han-rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 10/700,478

(22) Filed: Nov. 5, 2003

(65) Prior Publication Data

US 2004/0100724 A1  May 27, 2004

(30) Foreign Application Priority Data

Nov. 22, 2002  (KR) ...................... 10-2002-0073043

(51) Int. Cl.
*G06F 1/16* (2006.01)
*G11B 17/00* (2006.01)

(52) U.S. Cl. ...................... 361/685; 206/523; 428/567; 360/97.01

(58) Field of Classification Search ........ 361/679–687; 206/523, 591, 594, 588; 360/97.01, 244.8; 473/522; 428/567
See application file for complete search history.

(56) References Cited

U.S. PATENT DOCUMENTS 4,873,149 A * 10/1989 Shinoda et al. ............. 428/609
5,149,090 A * 9/1992 Chen et al. .................. 473/522
6,567,265 B1 * 5/2003 Yamamura et al. ......... 361/685
6,764,772 B1 * 7/2004 Clyne et al. ................ 428/567
6,809,916 B1 * 10/2004 Nakata et al. .............. 361/115
2004/0070865 A1 * 4/2004 Sri-Jayantha et al. .... 360/97.01

FOREIGN PATENT DOCUMENTS

KR     2002-42141      6/2002

\* cited by examiner

*Primary Examiner*—Hung Van Duong
(74) *Attorney, Agent, or Firm*—Staas & Halsey LLP

(57) ABSTRACT

A damping apparatus which includes a first member joined to a first object; a second member joined to a second object; and a vibration absorbing member installed between the first and second members for absorbing vibration. At least one of the first and second members is provided with elastic hooks so that the elastic hooks can be elastically caught by respective edge portions provided at the corresponding object, and the member can be joined to the corresponding object. In this structure, since at least one of the first and second objects is simply joined to the damping apparatus by using the elastic hooks, the installation process of the damping apparatus can be performed in a very simple manner. In addition, since screwing members are unnecessary in the side using the elastic hooks, the number of parts can be reduced.

7 Claims, 5 Drawing Sheets

DAMPING APPARATUS

CROSS-REFERENCE TO RELATED APPLICATIONS

This application claims the benefit of Korean Patent Application No. 2002-73043, filed on Nov. 22, 2002, in the Korean Intellectual Property Office, the disclosure of which is incorporated herein by reference.

BACKGROUND OF THE INVENTION

1. Field of the Invention

The present invention relates to a damping apparatus restraining vibration transfer between objects.

2. Description of the Related Art

In general, as shown in FIG. 1, a damping apparatus 10 is installed between two objects 11 and 12 to restrain vibration transfer between the two objects. The conventional damping apparatus is comprised of a rubber member 13 for absorbing vibration, and lower and upper plates 14 and 15 made of steel and joined to the lower and upper ends of the rubber member 13, respectively, by adhesive bonding or insert molding. Threaded portions 14a and 15a are provided at the lower and upper plates 14 and 15, respectively. After the threaded portions 14a and 15a are inserted through the through-holes 11a and 12a, nuts 16 and 17 are tightened to fix the damping apparatus 10 between the two objects 11 and 12. After assembly, the rubber member 13 buffers a vibration generated by either of the objects 11 and 12 to lessen vibration transfer between the objects.

In joining the damping apparatus 10 to the two objects 11 and 12, another method is employed in addition to the above-mentioned method in which the nuts 16 and 17 are fitted around the threaded portions 14a and 15a and tightened. Alternatively, a threaded hole 14a' is provided at one plate, for example, the lower plate 14, and a bolt 16' is screwed to fasten the object 11 to the damping apparatus 10 as shown in FIG. 2.

However, in both of these structures, drawbacks include that the processes of manufacturing and installing the damping apparatus are very troublesome. That is, for example, in the damping apparatus 10 shown in FIG. 1, first, the lower and upper plates 14 and 15 are made by press stamping or casting. Then, the plates 14 and 15 are provided with respective through holes, and the threaded portions 14a and 15a are assembled to the respective plates 14 and 15. Thereafter, the rubber member 13 is attached to the assembled plates 14 and 15 with an adhesive, or is joined to the assembled plates 14 and 15 by insert molding. Since the conventional damping apparatus 10 is manufactured as described above, the manufacturing process thereof is troublesome.

Further, in the installing process of the damping apparatus 10, the damping apparatus 10 is disposed on the first object 11, and the threaded portion 14a and the nut 16 are firmly joined. Then, the second object 12 is disposed on the damping apparatus 10, and the threaded portion 15a and the nut 17 are firmly joined. Since the installing process requires multiple assembling steps as described above, the installing process is not as simple as desired. Further, from a view of material management, or manufacturing cost, it is not preferable that separate joining members, such as the nuts 16 and 17 and the bolt 16', must be separately prepared and used.

Therefore, a damping apparatus having an improved structure is required to overcome these drawbacks, among others.

SUMMARY OF THE INVENTION

The present invention provides a damping apparatus having an improved structure so that the installing process thereof can be conveniently performed.

According to an aspect of the present invention, a damping apparatus is provided including a first member joined to a first object, a second member joined to a second object, and a vibration absorbing member installed between the first and second members for absorbing vibration. At least one of the first and second members is provided with elastic hooks used in joining so that the elastic hooks can be elastically caught by respective edge portions provided at the corresponding object, and the member can be joined to the corresponding object.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments taken in conjunction with the accompanying drawings in which.

DETAILED DESCRIPTION OF THE INVENTION

Figure 1:
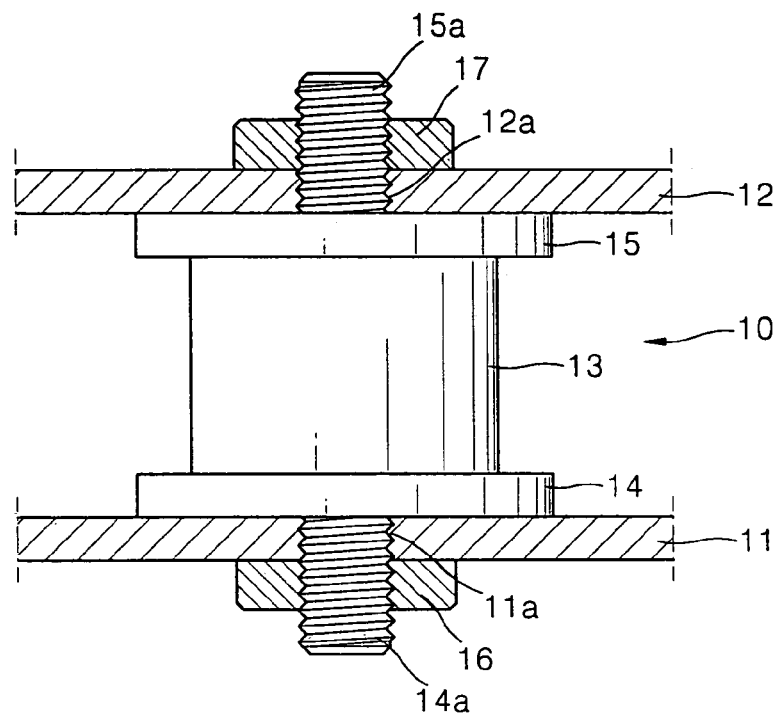
FIG. 1 is a partially sectioned view illustrating a conventional damping apparatus.
Figure 2:
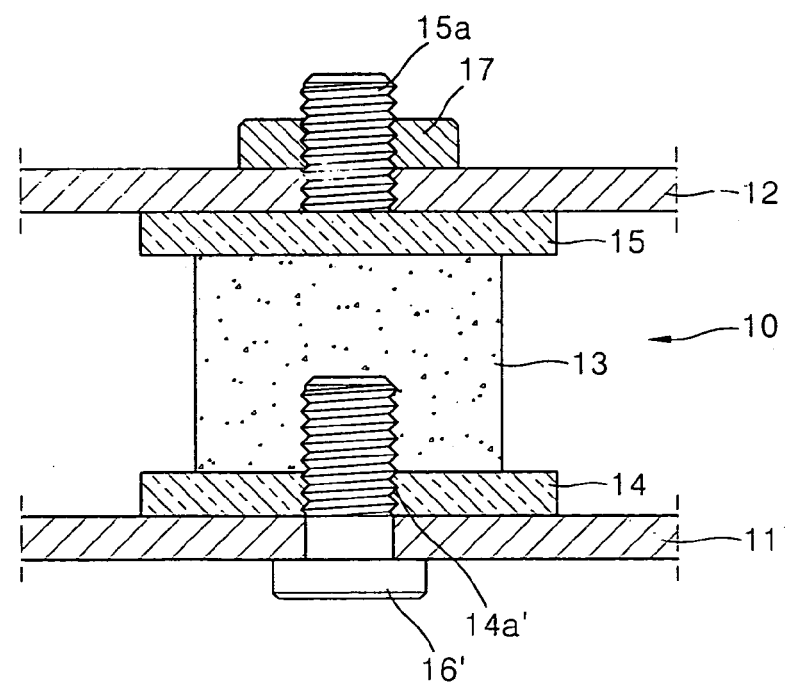
FIG. 2 is a section view illustrating another conventional damping apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3A:
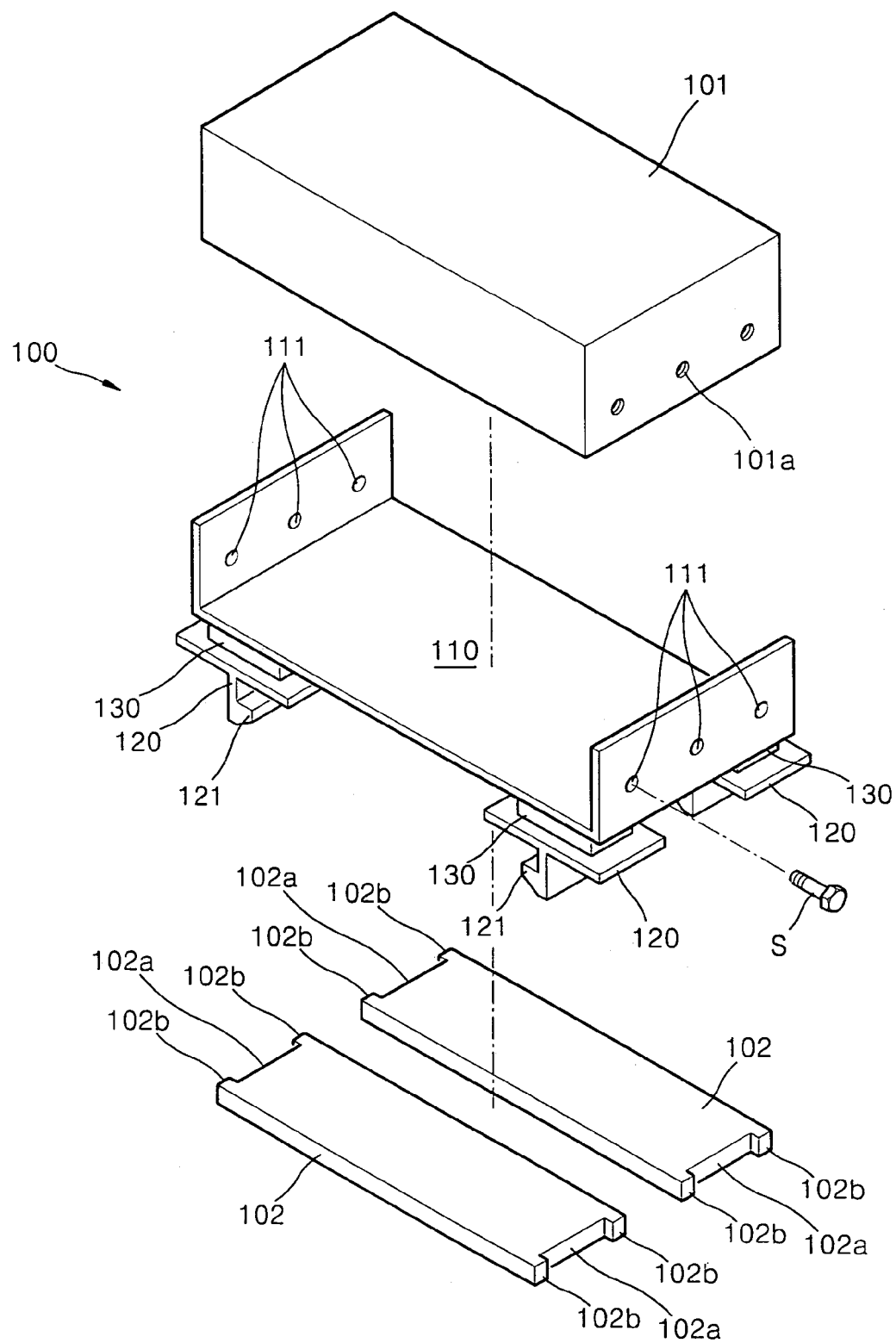
FIG. 3A is an exploded perspective view illustrating a damping apparatus according to an aspect of the present invention.
Figure 3B:
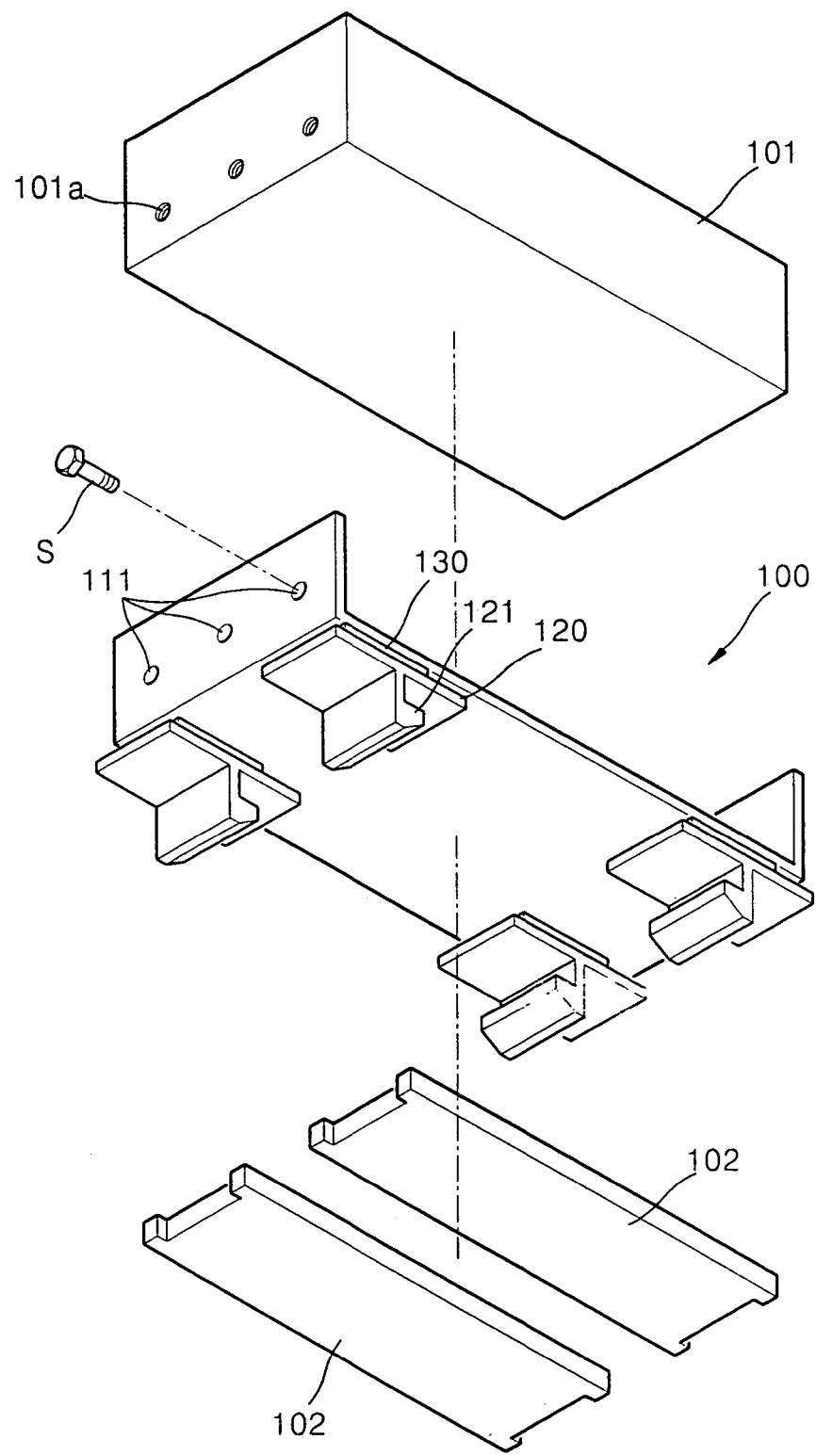
FIG. 3B is a bottom perspective view of the damping apparatus shown in FIG. 3A.

FIGS. 3A and 3B are exploded perspective views illustrating a damping apparatus according to an aspect of the present invention, viewed from an upper position and a lower position, respectively.

As shown in FIGS. 3A and 3B, a damping apparatus 100 is installed between the objects 101 and 102, and restrains vibration transfer between the objects 101 and 102. FIGS. 3A and 3B each show an example in which the first object 101 is a hard disk drive, and the second object 102 is a base plate on which the hard disk is installed. As illustrated in FIGS. 3A and 3B there may be multiple base plates 102. Alternatively the base plate 102 can be one plate (not shown). Since the hard disk drive 101 generates various vibrations due to the high-speed revolution of the hard disk, the vibrations may be transferred to other related components and the surroundings. In addition, when external vibrations are transferred to the hard disk drive, recording and/or reproducing operations of the hard disk drive may be affected by the external vibrations. Therefore, it is necessary to reduce vibration transfer between the objects 101 and 102 by installing the damping apparatus between the objects 101 and 102.

Figure 4:
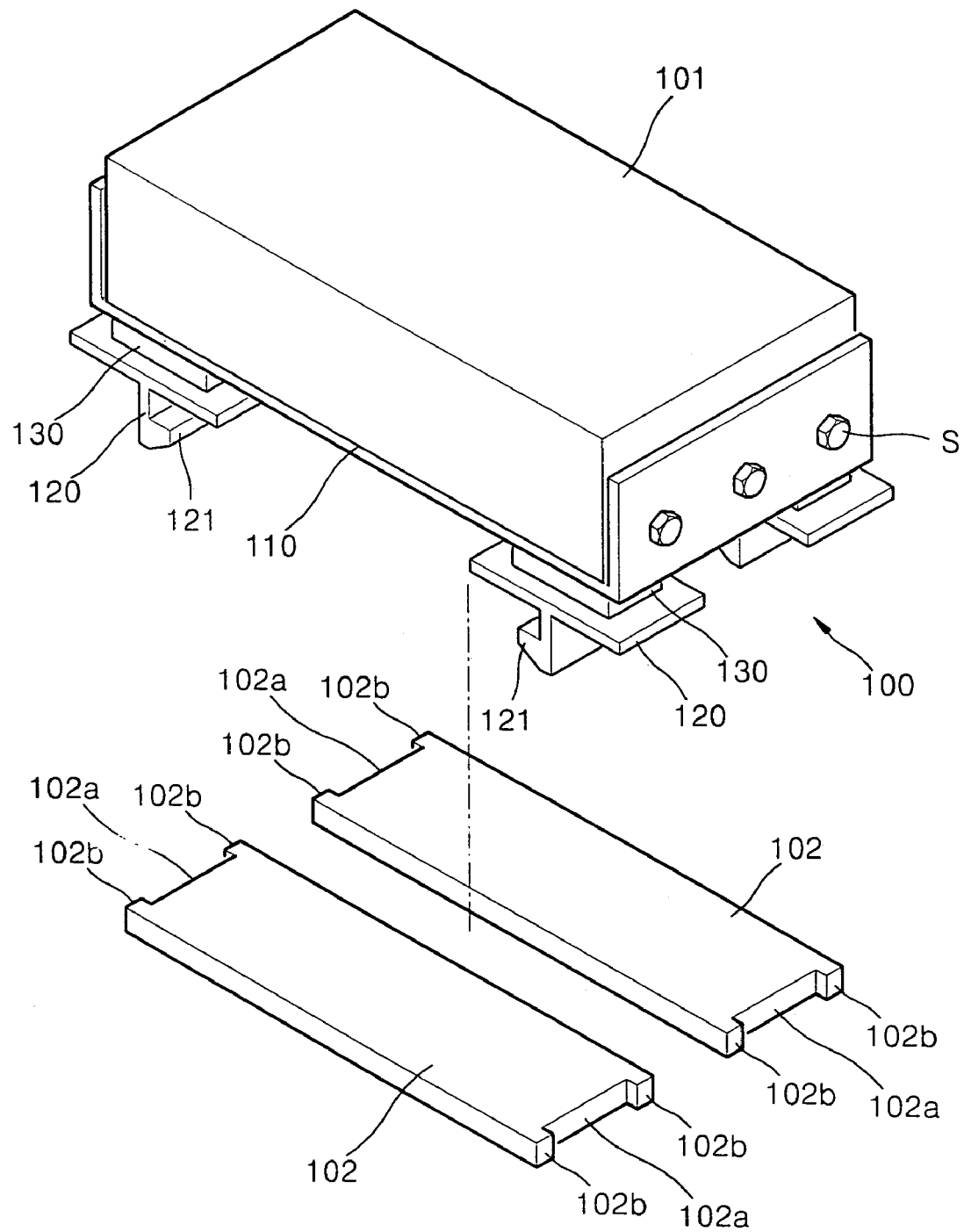
FIGS. 4 and 5 are perspective views for explaining the installing of the damping apparatus shown in FIGS. 3A and 3B.

The damping apparatus 100 includes a rubber member 130 that is a vibration absorbing member for absorbing vibration, and first and second members, e.g., upper and lower plates 110 and 120 joined to upper and lower sides of the rubber member 130, respectively. The upper and lower plates 110 and 120 are joined to the upper and lower surfaces of the rubber member 130, respectively by attaching with an adhesive, or insert molding. The upper plate 110, of the two plates 110 and 120, is joined to a first object. Screws S (FIG. 4) are screwed into the threaded holes 101a of the first object 101 through the through holes 111, as illustrated in FIGS. 3A and 3B. According to an aspect of the invention, the upper plate 110 is made of a stainless steel plate plated with nickel substantially preventing the effects of electromagnetic interference.

In addition, the lower plate 120 is provided with elastic hooks 121 elastically catchable by the second object 102. According to an aspect of the invention, the lower plate 120 is made of a strongly elastic material such as spring steel, aluminium, or engineering plastic.

The damping apparatus 100, having such a structure, is installed between the first and second objects 101 and 102. The damping apparatus 100 is joined to the first object 101. After through holes 111, formed in the upper plate 110 are aligned with the threaded holes 101a of the first object 101, screws S are fitted to the through holes 111, screwed into the threaded holes 101a, and tightened.

Thereafter, the damping apparatus 100 assembled to the first object 101 is assembled to the second object 102. The damping apparatus 100 is simply pressed downward so that the elastic hooks 121 are elastically caught by edge portions 102a of the second object 102 and can be locked as shown in FIG. 5.

Figure 5:
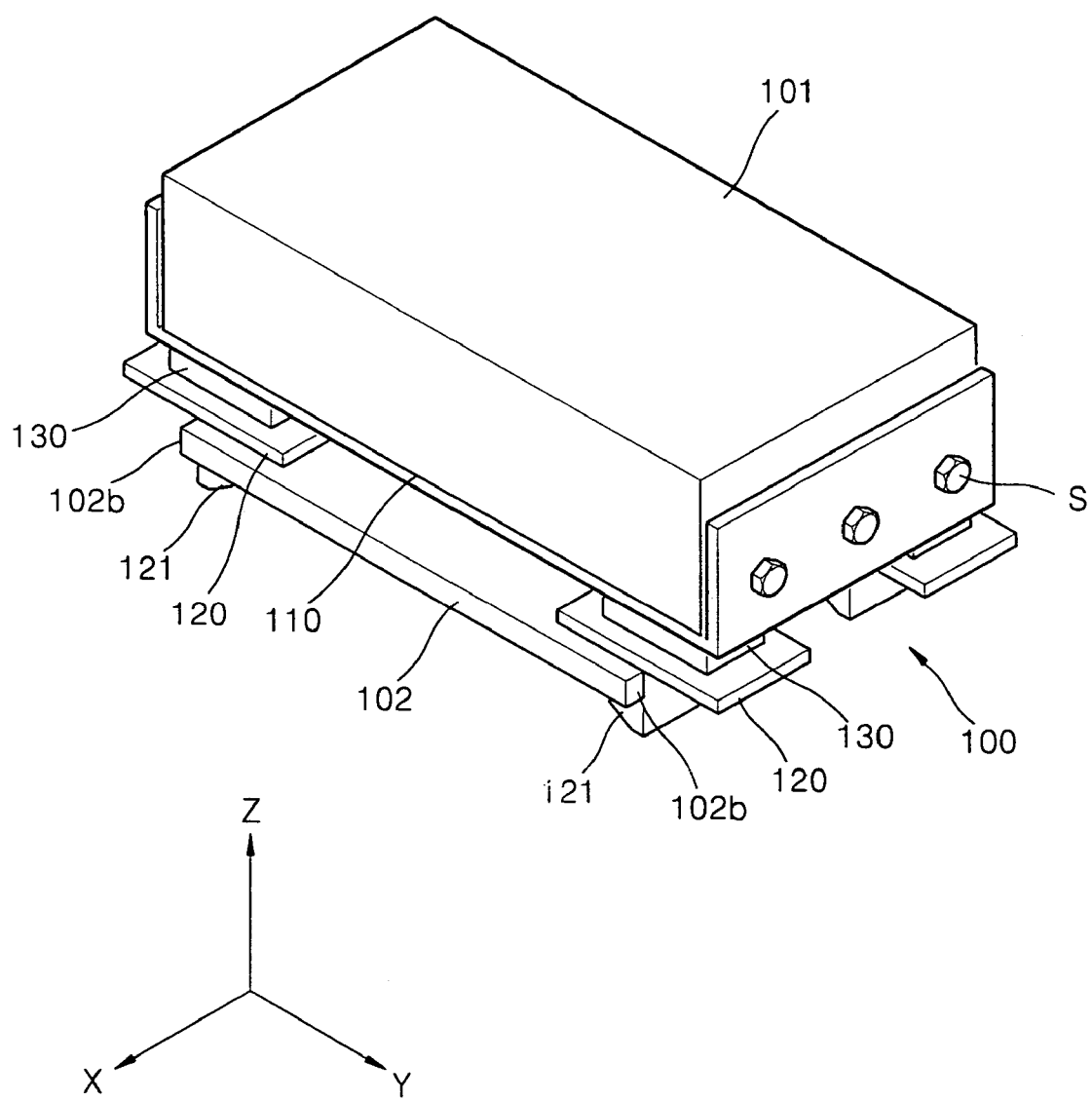

After the damping apparatus 100 is assembled to the objects 101 and 102 as described above, vibrations transferred in any of the directions of X, Y, and Z axes, as shown in FIG. 5 are lessened by the damping apparatus 100. For example, when a vibration is transferred in the X-axis direction, the elastic hooks 121 are caught, and locked, by the hooking projections 102b and, therefore, the vibration and impact are absorbed by the shear deformation of the rubber member 130. In addition, when a vibration is transferred in the Y-axis direction, the elastic hooks 121 facing each other exert a locking force towards each other with the second object 102 interposed therebetween, and, therefore, the vibration and impact are absorbed by shear deformation of the rubber member 130. When vibration is transferred in the Z-axis direction, the hooking projections of the elastic hooks 121 are caught and locked by edge portions 102a of the second object 102, and, therefore, the vibration and impact are absorbed by compression or elongation deformation of the rubber member 130. Consequently, a vibration transferred to any direction can be absorbed and lessened smoothly.

As described above, in the damping apparatus according to an aspect of the present invention, since at least one of the first and second objects is simply joined to the damping apparatus by using elastic hooks as opposed to a conventional apparatus having the first and second objects joined to the damping apparatus by requiring the screwing of all screwing members such as bolts and nuts and the like, the installation process of the damping apparatus of the present invention can be performed in a simpler manner. In addition, since screwing members are unnecessary in the side using the elastic hooks, the number of parts can be reduced.

Although a few embodiments of the present invention have been shown and described, it would be appreciated by those skilled in the art that changes may be made in this embodiment without departing from the principles and spirit of the invention, the scope of which is defined the appended] claims and their equivalents.

What is claimed is:

1. A damping apparatus, comprising:
a first member joinable to a first object;
a second member joinable to a second object; and
a vibration absorbing member installed between the first and second members,
wherein at least one of the first and second members has elastic hooks that are elastically catchable by respective edge portions of the corresponding object for joining the member to the corresponding object, and
one of the first and second objects is a hard disk drive and the other of the objects is a base plate.

2. A damping apparatus, comprising:
a first member joinable to a first object;
a second member joinable to a second object; and
a vibration absorbing member installed between the first and second members,
wherein at least one of the first and second members has elastic hooks that are elastically catchable by respective edge portions of the corresponding object for joining the member to the corresponding object, and
the first and second members are joined to the upper and lower surfaces, respectively of the vibration absorbing member by attaching with an adhesive or insert molding.

3. A damping apparatus for a hard disk drive, comprising:
an upper plate joinable to the hard disk drive;
a lower plate joinable to a base plate; and
a vibration absorbing member installed between the upper and lower plates;
wherein the lower plate is elastically hookable to the base plate and the upper plate is joinable to the hard disk drive before the lower plate is joined to the base plate.

4. The damping apparatus according to claim 3, wherein the vibration absorbing member is a rubber member.

5. The damping apparatus according to claim 3, wherein the lower plate is a plurality of elastic hooks elastically catchable by respective edge portions between hooking projections of the base plate.

6. A damping apparatus for lessening electromagnetic interference of a hard disk drive, comprising:
a first member made of a stainless steel plate plated with nickel joinable to the hard disk drive;
a second member made of a strongly elastic material joinable to a base; and
a vibration absorbing member installed between the first and second members,
wherein the second member is provided with elastic hooks catchable at respective edge portions of the base.

7. The damping apparatus according to claim 6, wherein the vibration absorbing member is a rubber member.

* * * * *